April 3, 1956 — J. H. MORROW — 2,740,672
CONVEYING APPARATUS
Filed March 11, 1953 — 4 Sheets-Sheet 1

INVENTOR
Joseph H. Morrow
BY Pennie Edmonds Morton Barrows & Taylor
ATTORNEYS

April 3, 1956 J. H. MORROW 2,740,672
CONVEYING APPARATUS
Filed March 11, 1953 4 Sheets-Sheet 2
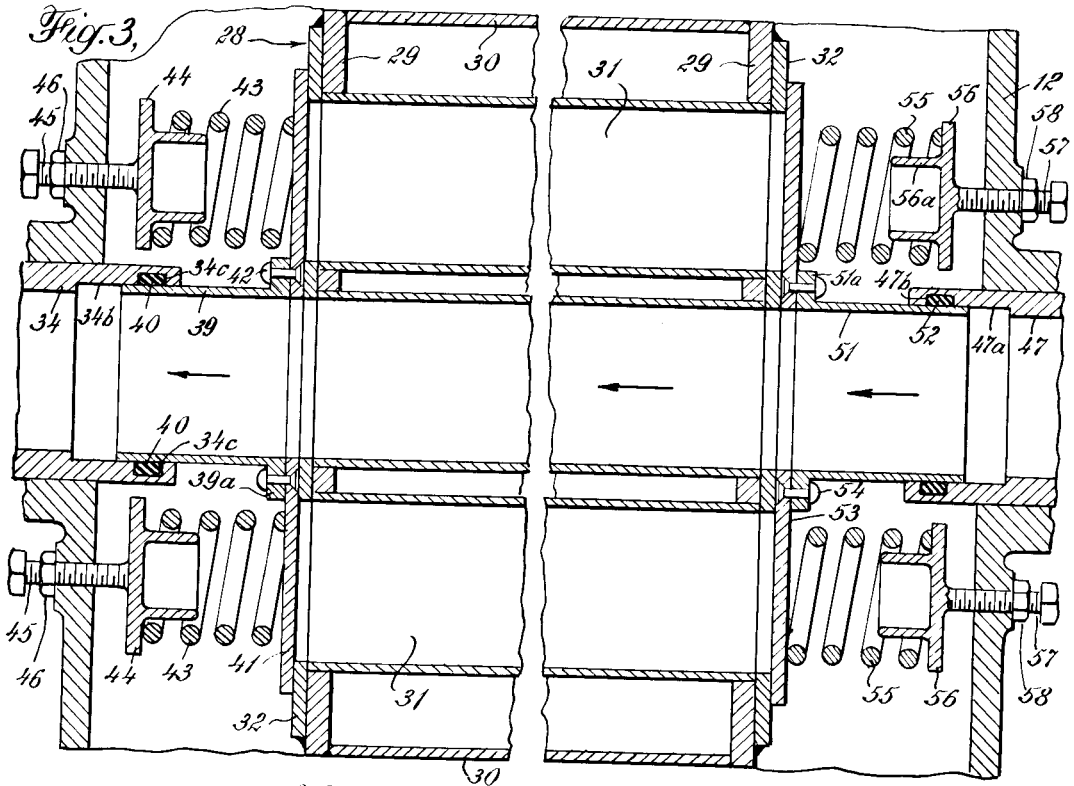
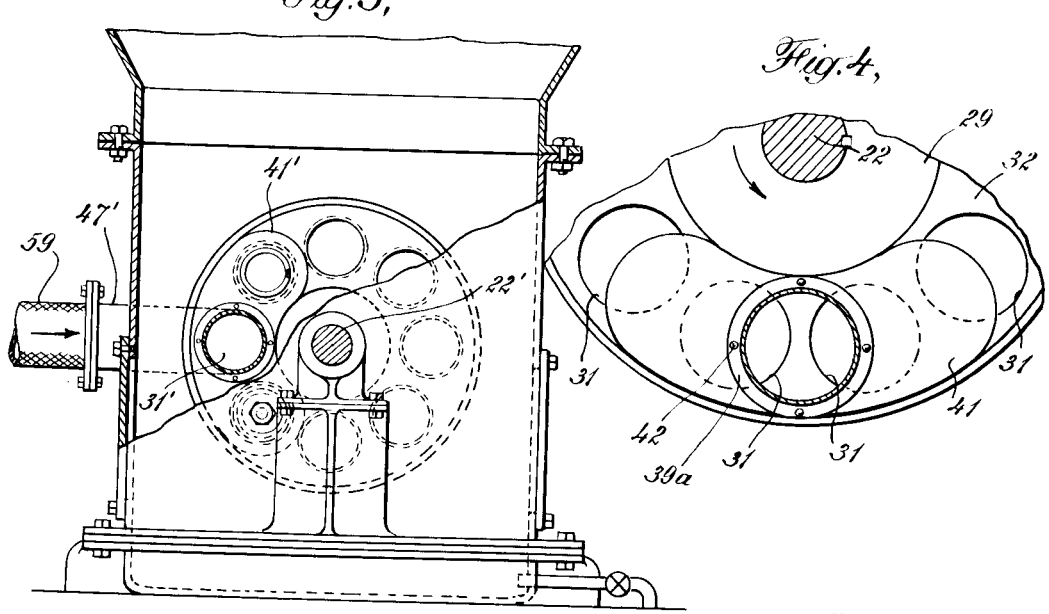
INVENTOR
Joseph H. Morrow
BY
Pennie Edmonds Morton Barrows Taylor
ATTORNEYS April 3, 1956 J. H. MORROW 2,740,672
CONVEYING APPARATUS
Filed March 11, 1953 4 Sheets-Sheet 3
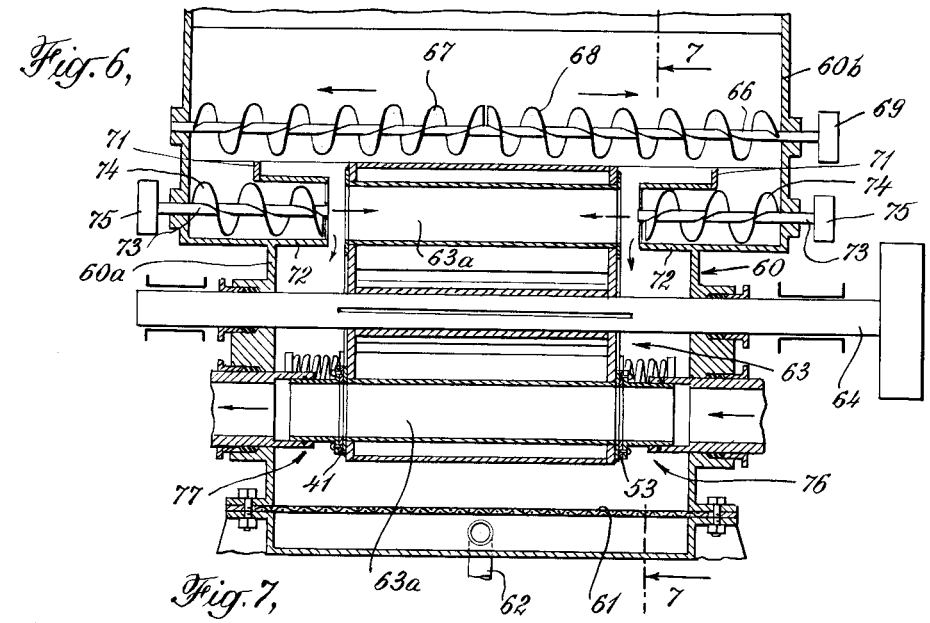
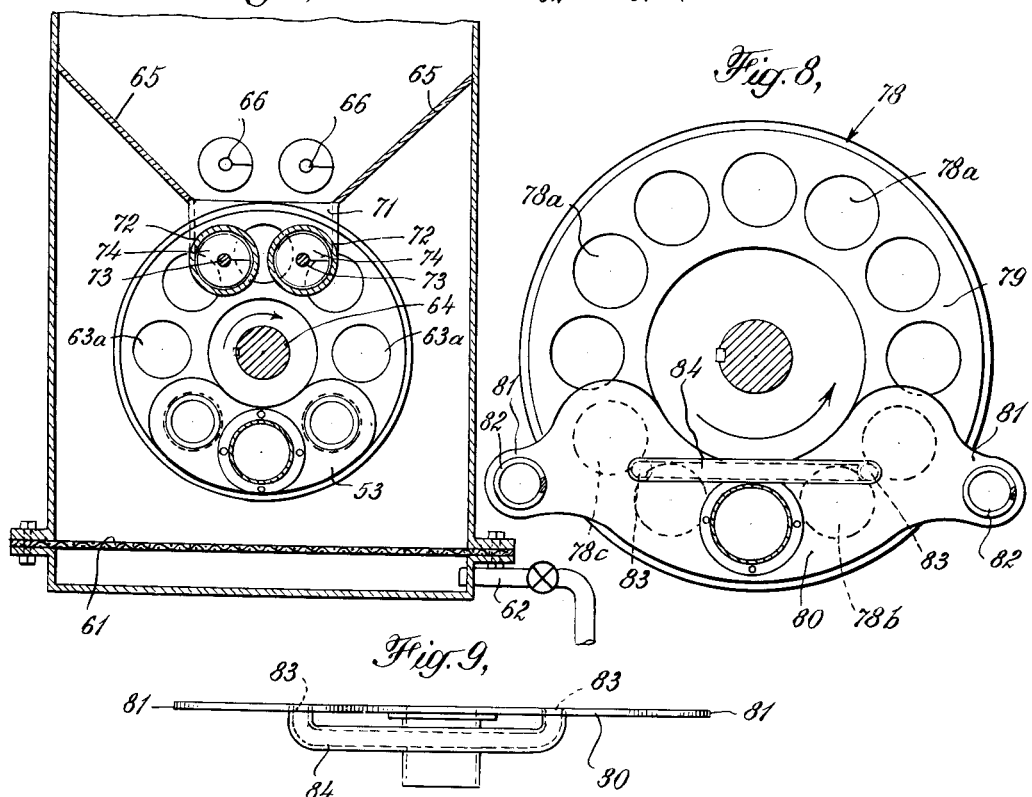
INVENTOR
Joseph H. Morrow
BY
Pennie Edmonds Morton Burrows Taylor
ATTORNEYS

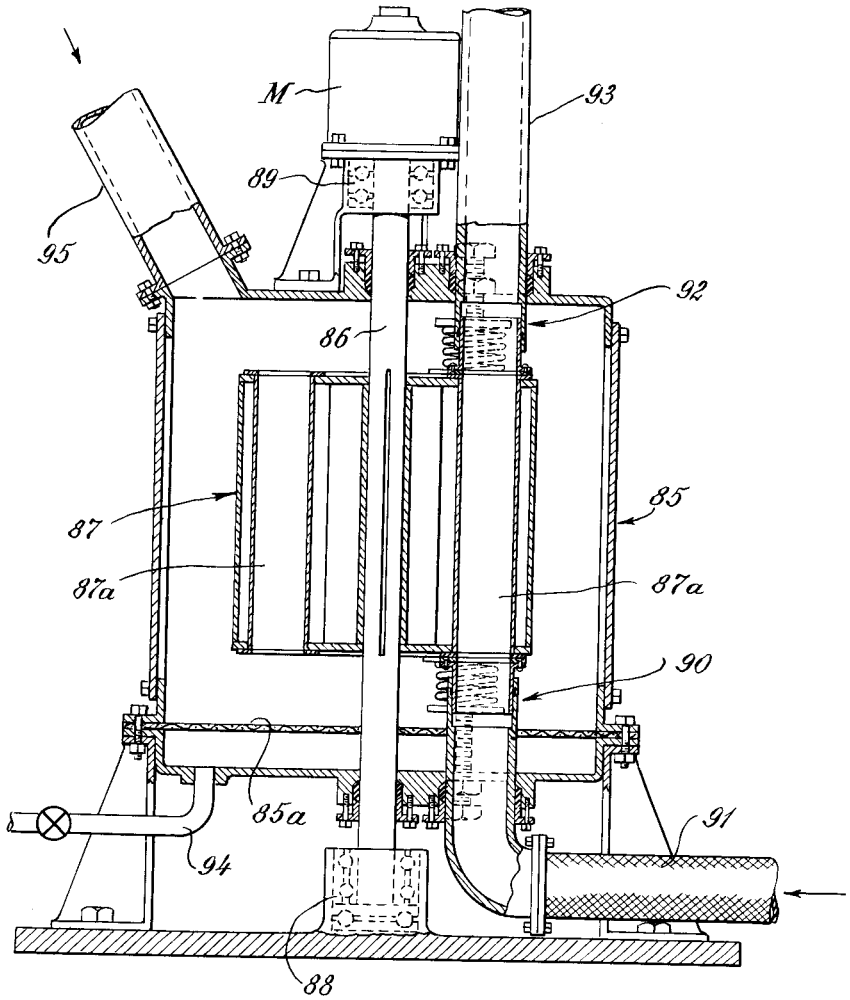

United States Patent Office 2,740,672
Patented Apr. 3, 1956

2,740,672

CONVEYING APPARATUS

Joseph H. Morrow, Hokendauqua, Pa., assignor to Fuller Company, Catasauqua, Pa., a corporation of Delaware Application March 11, 1953, Serial No. 341,715

15 Claims. (Cl. 302—49)

This invention relates to the conveying of pulverulent or finely divided material occurring naturally or produced by grinding or other operations. More particularly, the invention is concerned with a novel method of conveying pulverulent material pneumatically, that is, by the use of gas under pressure, and with an apparatus by means of which the new method can be efficiently practiced. The new method affords various advantages over prior methods of conveying pulverulent materials and requires relatively simple apparatus, which can be constructed and operated at comparatively low cost per unit weight of material conveyed.

Pulverulent material is now conveyer pneumatically in systems of various types and one such system includes a closed vessel referred to as a blow tank having an outlet connected to a conduit leading to the delivery point. In the use of this system, the outlet is closed and the material is fed into the tank, until the latter is partly full. Air under pressure is then introduced into the tank above the material until the necessary pressure has built up, whereupon the outlet is opened and the material is forced out of the tank and travels through the conduit entrained in the air stream. Such blow tank systems can be used to convey material, which can be rendered fluent by aeration, for great distances but they are inherently intermittent in operation and continuous conveying can be approached only by the use of two tanks discharging alternately into the conveying conduit. Also, blow tank systems employ high pressure air and require a large reserve air receiver because of the great fluctuations in pressure.

A second widely used system for conveying pulverulent material is that disclosed in Kinyon U. S. Patent No. 1,553,539. In the Kinyon system, the material is fed into the casing of an impeller screw which is so constructed as to compact the material being advanced toward the casing outlet to form a continuous material seal of adequate density to prevent the rearward flow of compressed air injected beyond the seal, to fluidize the material and force it through the conduit. The pressure of the air supply is that necessary to overcome the back pressure in the transport line, as determined by the length and diameter of the line and the quantity and specific gravity of the material handled. The supply pressure varies automatically as these conditions change, e. g., when the material is diverted to an intermediate point in the transport system. The material is conveyed by continuous displacement of material into the transport line by the screw and the pressure of the expanding air. The Kinyon pump is limited, therefore, to relatively fine materials which can be fluidized. The Kinyon pump is not normally used for conveying heavy materials, such as Portland cement, beyond about three thousand feet, because the necessary material seal density requires excessive screw driving power which results in premature wear of the terminal flights of the screw. This pump is also limited, as to conveying distances, for fragile materials, such as flour, which tends to scorch due to frictional heat, or soda ash, which is liable to crystal breakage, if the seal density is high.

In another type of system for conveying pulverulent materials, air is blown or drawn at high velocity through a transport line and the material is fed into the stream through a suitable airlock feeder. In such systems, the individual materials are carried in suspension in a high velocity air stream, and this type of conveyor requires relatively large volumes of low pressure air. It is not limited, however, to handling materials which can be fluidized by aeration.

The method of conveying of the present invention has features in common with those of prior systems, but it is superior thereto in important respects. Although the invention is not limited to the conveying of materials which readily become fluent upon proper aeration, it is particularly applicable to materials of that class. A single apparatus is utilized to provide a substantially uniform and continuous flow of material through the conduit or transport pipe line. Unlike the Kinyon pump, the material is aerated to render it fluent before it is moved or displaced into the conduit and the fluent material is not compacted, as in the seal of the Kinyon pump. The method is, therefore, appropriate to the handling of fragile materials liable to damage if compacted. The elimination of the material seal reduces the power requirement and the wear of operating parts. The new system may be operated with higher pressure air than prior continuous systems and, as a result, its air-material ratio is lower, the transport line velocity is lower, and less air is consumed, and a smaller diameter transport line may be used for a given conveying rate.

In conveying in accordance with the method of the invention, a body of pulverulent material is continuously maintained within a vessel, from which a transport conduit leads, the conduit having an intake open to the material. The material within the vessel is rendered fluent by air continuously diffused into it and conveying is effected by laterally confining a column of the fluent material within the body, moving the column to cause one end of the column to pass across the conduit intake, and, while the end of the column is traversing the intake, directing air under pressure against the other end of the column. The air blast forces the confined column into and through the conduit and the operations described are repeated in close sequence, so that the conveying is substantially a continuous operation.

For a better understanding of the invention, reference may be made to the accompanying drawings, in which—

Fig. 3 is a sectional view on line 3—3 of Fig. 2;

Fig. 4 is a fragmentary sectional view of a sealing plate or shoe employed in the apparatus;

Fig. 5 is a view, partly in elevation and partly in section, of a modified form of the apparatus;

Fig. 6 is a fragmentary vertical sectional view of another form of the apparatus, with some parts shown diagrammatically;

Fig. 7 is a sectional view on line 7—7 of Fig. 6;

Fig. 8 is a vertical sectional view showing a modified form of sealing plate;

Fig. 9 is a fragmentary plan view of the sealing plate shown in Fig. 8; and

Fig. 10 is a view, partly in vertical section and partly in elevation, of another form of the apparatus.

Figure 1:
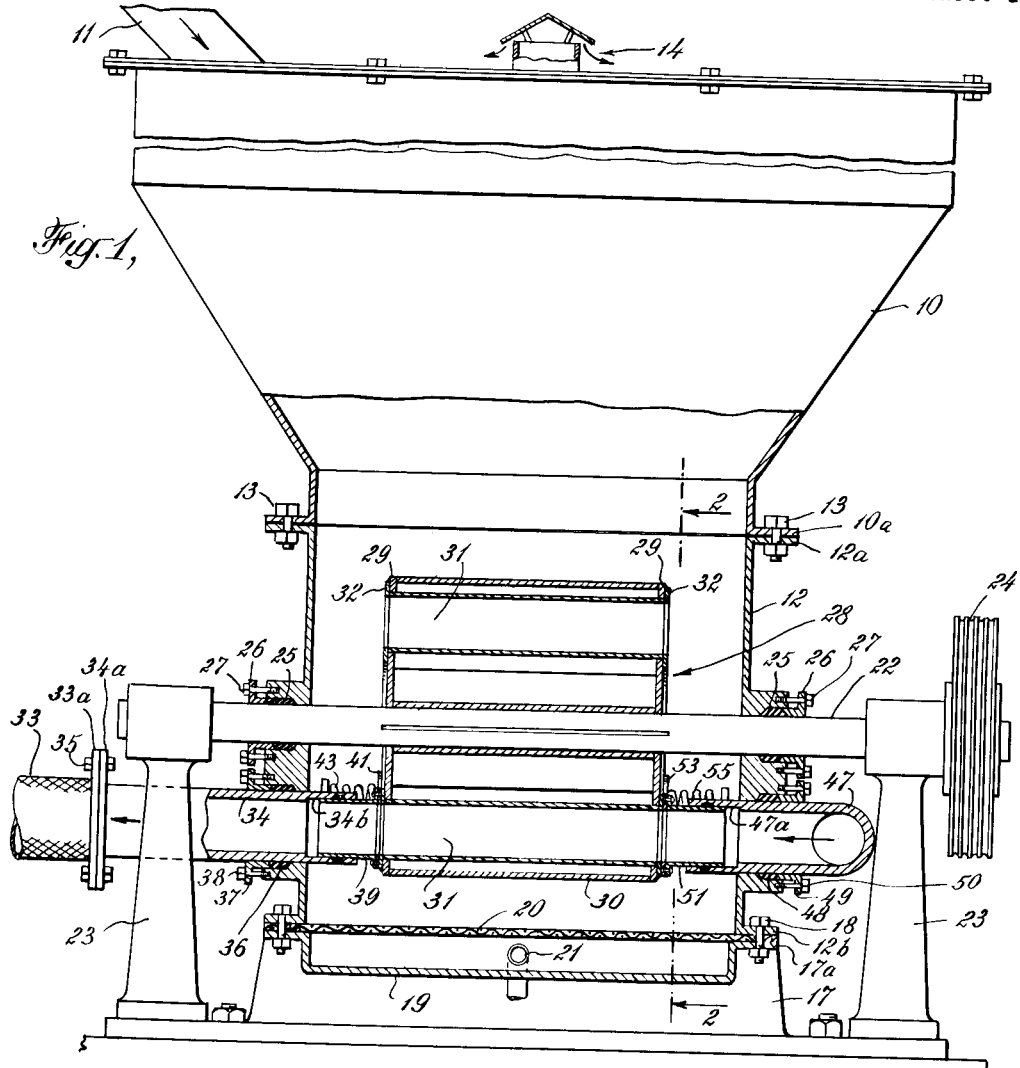
Fig. 1 is a view, partly in vertical section and partly in elevation, of one form of the new apparatus.

In the conveying apparatus illustrated in Figs. 1–5, inclusive, the pulverulent material to be conveyed is fed either continuously or intermittently, as desired, into a hopper 10 through a chute 11 or other convenient means. The hopper 10 is mounted on top of a housing 12 by means of bolts 13 through flanges 10a and 12a on the hopper and housing, respectively. The hopper has a closed top with a vent 14, which may be open to the atmosphere or connected to a dust collector, and has access openings in opposite sides, which are normally closed by plates 15, held in place by screws 16. The housing 12 rests on a base 17 and is secured in place by bolts 18 through flanges 12b and 17a on the housing and base, respectively. The base is formed with a wall 19 serving as the bottom of the housing.

A porous aerating element 20 is secured between the flanges 12b and 17a and acts as a false bottom for the housing. Air is introduced into the housing below the element 20 by a supply pipe 21 and passes upward through the element 20 and into the pulverized material to aerate the material and render it fluent.

A horizontal shaft 22 extends through the housing and is mounted for rotation in bearings in pedestals 23 outside the housing. The shaft is rotated by any suitable means, as, for example, by means of a pulley 24 fast on one end of the shaft, and leakage along the shaft through the walls of the housing is prevented by glands, each including a packing 25 encircling the shaft at an opening in the wall and compressed by a ring 26 against its packing by screws 27 threaded into a thickened section of the wall around the opening.

A rotor 28 is fast on the shaft within the housing and comprises a pair of end plates 29 attached to the shaft and connected by a cylinder 30. The plates 29 have aligned openings arranged in a circular series concentric with shaft 22, and tubes 31 have their ends in aligned openings in the two plates and form open-ended chambers. Annular hard-surfaced wear plates 32, having openings registering with the openings in the end plates, are attached to the end plates.

A transport line 33 leads from the conveying apparatus to a delivery point and is provided with an intake comprising a section 34 attached to the line 33 by means of bolts 35 through flanges 33a and 34a on the line and section, respectively. The section 34 extends parallel to shaft 22 through an opening in the adjacent pedestal 23 and through an opening in the wall of housing 12, the opening in the housing wall being sealed by a gland, comprising packing 36, compressed by a ring 37 acted on by screws 38 threaded into a thickened portion of the wall. The inner end of section 34 has a portion 34b of enlarged inside diameter, within which is an intake pipe 39, whose inside diameter is the same as that of the chambers 31. The intake pipe 39 is slidable within the enlarged portion 34b of the intake section, and a seal is maintained between the intake section and the pipe by an O-ring 40 retained in a circumferential groove 34c cut into the enlarged portion 34b.

A sealing plate or shoe 41 of kidney shape and of wear-resistant material is secured to a flange 39a on the end of the intake pipe 39 by means of rivets 42. The sealing plate 41 has an opening therein aligned with the pipe 39 and of the same diameter as the internal diameter of the pipe. The flat outer face of the sealing plate bears against the adjacent wear plate 32 on the end of the rotor, and, as the rotor turns, the chambers 31 successively come into alignment with the opening in the sealing plate. The sealing plate is of sufficient size to cover the ends of three chambers and thus closes a chamber on each side of the chamber, which is aligned at any time with the opening in the plate.

The sealing plate 41 is held yieldingly against the wear plate 32 by a pair of coil springs 43 bearing at one end against the back surface of the plate on each side of the pipe 39. The outer ends of the springs 43 are entered by the ends of guides 44 having threaded stems 45 extending through openings in the wall of housing 12. The guides are adjustable to vary the compression of springs 43 and are held in adjusted position by lock nuts 46 on the stems. The springs may be located outside the housing, if desired, and exert force on the sealing plate through rods extending through the housing, or the sealing plate may be held against the wear plate by hydraulic, pneumatic, or similar means.

As each chamber 31 is moved into alignment with the intake of the transport conduit, air or gas under pressure is directed into the end of the chamber remote from the intake through a nozzle 47 axially aligned with the intake 34. The nozzle 47 extends through an opening in the wall of housing 12 and is sealed in the opening by a gland including packing 48 compressed by a ring 49 acted on by screws 50 threaded into a thickened part of the housing wall. The end portion 47a of the nozzle is of enlarged inner diameter and contains a nozzle pipe 51 slidable in the nozzle. A seal is maintained between the nozzle and the pipe by an O-ring 52 retained in a circumferential groove 47b cut into the end portion 47a of the nozzle.

A kidney-shaped sealing plate or shoe 53 of wear-resistant material and similar to the sealing plate 41, is mounted on flange 51a on the end of the pipe 51 by means of rivets 54, and has an opening aligned with the pipe 51 and of the same size. The flat outer face of the sealing plate 53 lies in contact with the adjacent wear plate on the rotor, and the sealing plate is urged against the wear plate by a pair of coil springs 55 bearing against the back surface of the plate on each side of the pipe 51. The outer ends of springs 55 are entered by guides 56 having threaded stems 57 extending through openings in the wall of housing 12. The guides are adjustable to vary the compression of springs 55 and are held in adjusted position by nuts 58 on the stems.

In the operation of the apparatus described, the admission of air through the porous false bottom of the housing renders the pulverulent material fluent and, as the rotor rotates beneath the level of the material within the housing, the material enters and fills the rotor chambers 31. As the chambers successively pass between the air nozzle and the intake of the transport line, the air forces the column of fluidized material out of each chamber and into and through the conduit. Escape of the conveying air between the nozzle and the rotor and between the rotor and the intake is prevented by the sealing shoes 41, 53 mounted on the intake and nozzle, respectively. As there is little friction between the smooth outer surface of the rotor and the fluent body of material and there are no unbalanced forces acting on the rotor, the rotation of the rotor requires power only for overcoming the friction in the shaft bearings and the friction between the sealing shoes and the wear plates. The power consumption of the device for rotating the rotor is, accordingly, relatively small.

The modified apparatus shown in Fig. 5 is similar in all essential respects to that shown in Figs. 1–4, incl., except that the nozzle 47' supplied with air through an air line 59, is so disposed that its nozzle pipe is in line with a rotor chamber 31' lying in a horizontal plane through the rotor shaft 22'. The conduit intake is in line with the nozzle pipe and the sealing shoes, such as shoe 41' on the nozzle pipe, extend in a generally vertical direction. With the modified construction, it is possible to avoid the use of sharp bends in the air supply pipe and transport line close to the rotor without passing the pipe and line through openings in the bearing pedestals for the rotor shaft or employing a wide spacing between the shaft bearings.

The conveying apparatus in the form shown in Figures 1–5, incl., may be used in conveying freely flowing material which, when fluidized, will fill the chambers in the rotor as the latter turns. If the materials to be conveyed are not entirely free flowing, the modified form of the apparatus shown in Figs. 6 and 7 is preferably employed.

The Fig. 6 apparatus includes a housing 60 having a lower section 60a and an upper section 60b, which extends beyond section 60a at both ends. The lower section is provided with a porous false bottom 61, through which air supplied by pipe 62 is diffused into material within the housing, and a rotor 63, which is of the same construction as rotor 28, is mounted on the shaft 64 extending through the walls of section 60a of the housing and projects upwardly into the upper section 60b of the housing.

The upper housing section 60b is provided with a pair of downwardly convergent partitions 65 defining a trough, in which are mounted a pair of shafts 66, each carrying screw flights 67, 68 of opposite pitch. The shafts extend out through the end walls of the housing section and are mounted in suitable bearings carried by the wall, each shaft being provided with a pulley 69 or other means, by which it may be driven. At the bottom of the trough formed by partitions 65 are a pair of partitions 71 lying spaced from and extending parallel to respective end walls of housing section 60b. A pair of tubes 72 extend inward from each end wall of the housing through the adjacent partition 71 and corresponding tubes carried by the two partitions are in alignment. The tubes have top openings between the end wall and partition 71 and the tubes enclose conveyor shafts 73 having screw flights 74. The shafts extend out through the end walls of section 60b and are provided with means, such as pulleys 75, for rotating them. The tubes 72 are of a diameter approximately the same as the chambers 63a of the rotor and the tubes through each partition 71 are so disposed that, as the rotor turns, each chamber therein registers successively with aligned tubes at its opposite ends.

The screw flights on the conveyor shafts 66 are of such formation and the shafts are so driven that the flights 67, 68 move material from the middle of the upper housing section 60b toward the end walls of the section, and the material is thus continuously supplied to the tubes 72. The flights 74 on the shafts 73 within the tubes advance the material toward the rotor, so that, as each rotor chamber passes between aligned tubes 72, material is forced out of the tubes into the chamber. The tubes terminate short of the rotor and excess material from the tubes passes downward into lower housing section 60a in the spaces between the ends of the rotor and the ends of the tubes. As the filled chambers are carried along by the rotor, they are brought successively into registery with an air nozzle 76 and a transport conduit intake 77, which are of the construction employed in the other forms of the apparatus and previously described. The air blast delivered by nozzle 76 forces the material out of the chambers and into the transport line intake and the line.

In the modifications above described, the wear shoes on the transport line intake and on the air nozzle, such as shoes 41, 53, have a length such that they span the ends of three chambers in the rotor. As each filled rotor chamber is advanced between the shoes, it is initially wholly closed by the shoes, and then the chamber begins to move across the aligned air nozzle and transport line intake. In such movement, the blast issuing from the nozzle discharges the material from the chamber and fills the chamber with air at nozzle pressure. When the chamber moves out from between the wear shoes, the air within the chamber is released and enters the body of material being fluidized. This action results in a loss of air at higher pressure than is used for fluidizing purposes, and such loss of high pressure air can be reduced by employing the construction shown in Fig. 8.

Figure 2:
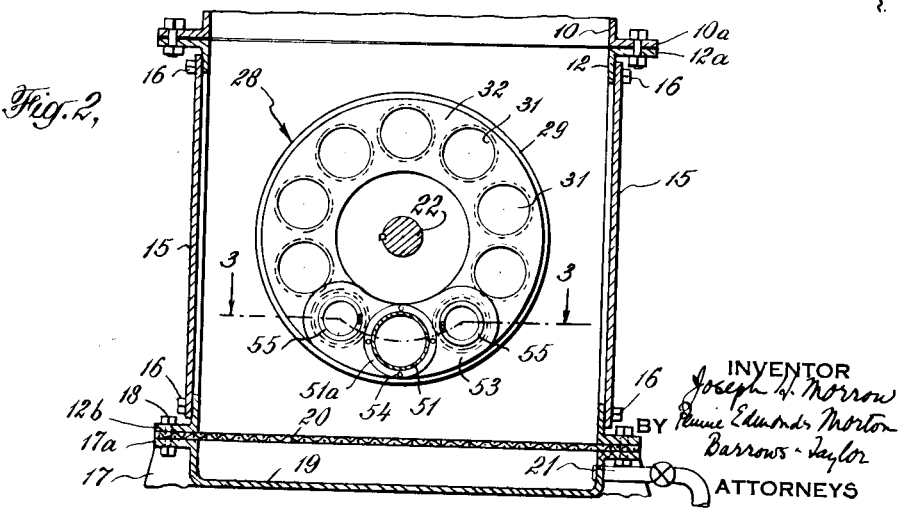
Fig. 2 is a sectional view on line 2—2 of Fig. 1.

The Fig. 8 modification includes a rotor 78, which is of the same construction as the rotor 28 and is formed with a succession of open-ended chambers 78a. Each end of the rotor is provided with an annular wear plate 79 similar to the plates 32 and having openings leading into the chambers 78a. The wear plates at the ends of the rotor are engaged by sealing plates or shoe 80, which are mounted on an air nozzle pipe and conduit intake section, respectively, and are of such a length as to span five chambers 78a. Each shoe has an extension 81 at each end engageable by a spring 82, which is similar in action and mounting to springs 43, 55 (Figs. 1–3). Each sealing shoe has a pair of spaced openings 83 connected by a pipe 84 and the openings are so spaced that, when a chamber 78a in the rotor is in alignment with the air nozzle pipe and conduit intake section, the openings lie between the two outer chambers 78a closed by the shoe and the two rotor chambers next inwardly therefrom.

When the sealing shoes illustrated in Fig. 8 are used and the rotor turns as indicated by the arrow, the chamber 78b, from which the material has just been discharged, is filled with air at high pressure. As this chamber passes into registry with aligned openings 83 in the two shoes, the chamber 78c of the rotor, which is filled with material, moves into registry with the other pair of openings 83 in the two shoes. The high pressure air in chamber 78b then passes immediately through the connecting pipes 84 into chamber 78c and the air pressure in the chambers 78b and 78c is approximately equalized. When chamber 78b moves out from between shoes 80, the air under pressure contained therein passes into the main body of material within the housing, but the pressure of the air is only half the nozzle pressure. When chamber 78c moves into registry with the air nozzle and transport conduit intake, the presence in the chamber of the air at approximately half the nozzle pressure results in an economy in the amount of air required for conveying.

The forms of the apparatus described up to this point are primarily for conveying purposes with the material transported through a conduit extending generally horizontally. If it is desired to employ the apparatus for elevating material, the construction shown in Fig. 10 may be used.

The apparatus shown in Fig. 10 is essentially the same as that shown in Figs. 1–3, incl., except that the housing 85 is generally cylindrical in form and the shaft 86 for the rotor 87 extends vertically and is mounted at its lower end in a step bearing 88. At its upper end, the shaft runs in a bearing 89 mounted on top of the housing, and a motor M above the bearing drives the shaft. The rotor 87 is similar to rotor 28 and it contains a plurality of chambers 87a open at top and bottom and brought into registry, as the rotor turns, with a nozzle 90 supplied with air through pipe 91 and with the intake 92 of a vertical riser pipe 93. The housing 85 is provided, as in the previous construction, with a porous false bottom 85a, through which air supplied by a line 94 is diffused into the material within the housing. The material is supplied to the housing through a line 95 leading into the top of the housing and is maintained at a level above the top of the rotor.

In the operation of the new conveying apparatus, the rotor is rotated at a relatively slow speed, such as 15 to 20 r. p. m., for example, and, since the external surfaces of the rotor are smooth and without pockets or projections, the rotor can be rotated within the body of fluidized material with little power consumption. The material is not compacted prior to being conveyed, but enters the chambers in the rotor and is discharged therefrom into the transport line in a fluent condition with a resultant economy in power consumption and in the amount of air required for conveying purposes.

In the new apparatus, it is possible to employ a much higher air pressure than may be employed in prior continuous conveying systems. The use of the higher air pressure permits a lower air-material ratio and lower transport line velocities with a resultant reduction in consumption of air under pressure. Also, with the employment of higher air pressures, it is possible to use transport lines of smaller diameter for a given rate of conveying. As the rotor is operated at a low speed and is of relatively light weight and easily accessible, the cost of maintenance and repair are relatively low.

Since it is not necessary in the new apparatus to compress the material being conveyed to create a seal, the apparatus may be employed for the conveyance of all kinds of materials, including those, which cannot stand the pressures required for the production of such a seal and the resultant temperatures. The apparatus operates somewhat like a blow tank, but there is no time in the rotation of the rotor, when at least one chamber therein is in registry to some extent with the air nozzle and transport line intake. As a consequence, the conveying is continuous and the transport line always contains aerated material. This reduces the amount of air required for conveying and also the power consumption. As the apparatus utilizes a constant flow of air at an approximately constant pressure, it can be supplied directly from a compressor without the necessity of employing an air receiver to compensate for pressure fluctuations.

I claim:

1. An apparatus for conveying pulverulent material, which comprises a vessel for holding a body of the material, a transport conduit having an intake open to the interior of the vessel, an air nozzle discharging into the interior of the vessel and coaxial with and spaced from the intake, a rotor within the vessel with its axis of rotation parallel to the common axis of the intake and nozzle, the rotor filling the space between the intake and nozzle and having a chamber closed at its sides and open at its ends, means for rotating said rotor, said chamber being so constructed and arranged that on rotation of the rotor the chamber is moved from a position in which at least one end is open to the space within said vessel to a position in which the open ends are in coincidence with the intake-nozzle axis, means for introducing air into the material in the vessel to render the material sufficiently fluent to enter and fill the chamber during rotation of the rotor, and means for supplying air under pressure to the nozzle.

2. An apparatus for conveying pulverulent material, which comprises a vessel for holding a body of the material, a transport conduit having an intake open to the interior of the vessel, an air nozzle discharging into the interior of the vessel and coaxial with and spaced from the intake, a rotor within the vessel with its axis of rotation parallel to the common axis of the intake and nozzle, the rotor filling the space between the intake and nozzle and having a plurality of parallel chambers closed at their sides and open at their ends, and arranged in a series concentric with its axis of rotation, the chambers being so constructed and arranged that on rotation of the rotor they are moved successively from positions in which at least one end is open to the space within said vessel to positions in which their open ends are in coincidence with the intake-nozzle axis, means for introducing air into the material in the vessel to render the material sufficiently fluent to enter and fill the chambers when an end thereof is open to the space within said vessel, and means for supplying air under pressure to the nozzle.

3. An apparatus for conveying pulverulent material, which comprises a vessel for holding a body of the material, a rotor within the vessel out of contact with the walls thereof and having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to positions in which their open ends are in coincidence with the intake-nozzle axis, means for introducing air into the material in the vessel to render it sufficiently fluent to enter the chambers during rotation of the rotor, means for rotating the rotor, means for supplying air under pressure to the nozzle, means on the nozzle engaging the rotor and preventing escape of air between the end of the nozzle and the opposed end of the rotor, and means on the conduit engaging the rotor and preventing escape of air between the end of the intake and the opposed end of the rotor.

4. An apparatus for conveying pulverulent material, which comprises a vessel for holding a body of the material, a transport conduit having an intake open to the interior of the vessel, an air nozzle discharging into the interior of the vessel and coaxial with and spaced from the intake, a rotor within the vessel with its axis of rotation parallel to the common axis of the intake and nozzle, the rotor filling the space between the intake and nozzle and having a chamber open at its ends only, means for rotating the rotor, said chamber being so constructed and arranged that on rotation of the rotor the chamber is moved from a position in which at least one end is open to the space within said vessel to a position in which the open ends are in coincidence with the intake-nozzle axis during rotation of the rotor, the conduit, nozzle, and chamber having substantially the same shape and cross-sectional area, means for introducing air into the material in the vessel to render the material sufficiently fluent to enter and fill the chamber during rotation of the rotor, means for rotating the rotor, and means for supplying air under pressure to the nozzle.

5. An apparatus for conveying pulverulent material, which comprises a vessel for holding a body of the material, a rotor within the vessel having its ends spaced a substantial distance from the walls of the vessel and having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for introducing air into the material in the vessel to render it sufficiently fluent to enter the chambers during rotation of the rotor, means for rotating the rotor, means for supplying air under pressure to the nozzle, a plate mounted on the nozzle and extending laterally therefrom, means for forcing the plate yieldingly against the end of the rotor to prevent escape of air between the end of the nozzle and the end of the rotor, and means on the conduit engaging the rotor and preventing escape of air between the end of the intake and the opposed end of the rotor.

6. An apparatus for conveying pulverulent material, which comprises a vessel for holding a body of the material, a rotor within the vessel having its ends spaced a substantial distance from the walls of the vessel and having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for introducing air into the material in the vessel to render it sufficiently fluent to enter the chambers during rotation of the rotor, means for rotating the rotor, means for supplying air under pressure to the nozzle, sealing elements mounted, respectively, on the nozzle and conduit, and means for forcing the sealing elements into yielding engagement with respective ends of the rotor.

7. An apparatus for conveying pulverulent material, which comprises a vessel for holding a body of the material, a horizontal shaft within the vessel, a rotor mounted on the shaft for rotation therewith and lying below the normal level of the body of material, the rotor having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for introducing air into the material in the vessel to render it fluent, means for rotating the rotor, means for supplying air under pressure to the nozzle, and means for feeding material from the body of material into the chambers successively.

8. An apparatus for conveying pulverulent material, which comprises a vessel for holding a body of the material, a horizontal shaft within the vessel, a rotor mounted on the shaft for rotation therewith and lying below the normal level of the body of material, the rotor having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for introducing air into the material in the vessel to render it fluent, means for rotating the rotor, means for supplying air under pressure to the nozzle, and conveying means within the vessel operating to feed material from the body of material into the chambers successively.

9. An apparatus for conveying pulverulent material, which comprises a vessel for holding a body of the material, a rotor within the vessel out of contact with the walls thereof and having a plurality of parallel chambers open at their ends only and in a series concentric with the rotor axis, an annular wear plate mounted on each end of the rotor, each plate having openings registering with the chambers, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for introducing air into the material in the vessel to render it sufficiently fluent to enter the chambers during rotation of the rotor, means for rotating the rotor, means for supplying air under pressure to the nozzle, arcuate sealing plates mounted, respectively, on the nozzle and conduit in opposition to the wear plates, each sealing plate overlapping a plurality of openings in its associated wear plate, and means engaging the respective sealing plates and forcing them into yielding contact with their wear plates.

10. Apparatus for conveying pulverulent material, which comprises a vessel for holding of a body of the material, the vessel having a pervious bottom wall, a vertical shaft within the vessel, a rotor mounted on the shaft for rotation therewith and lying wholly within the body of material normally within the container, the rotor having a plurality of parallel chambers open at their ends only and in a series concentric with the shaft, a vertical air nozzle within the vessel below the rotor, a transport conduit having an intake above the rotor, the ends of the nozzle and intake being coaxial, said chambers being so constructed and arranged that on rotation of the rotor they are moved successively from positions in which at least one end is open to the space within said vessel to a position in which their open ends are in coincidence with the intake-nozzle axis, means for supplying air to pass through the bottom wall of the vessel and into the material, means for rotating the rotor, and means for supplying air under pressure to the nozzle.

11. An apparatus for conveying pulverulent material, which comprises a vessel for holding a body of the material, a rotor within the vessel out of contact with the walls thereof and having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for introducing air into the material in the vessel to render it sufficiently fluent to enter the chambers during rotation of the rotor, means for rotating the rotor, means for supplying air under pressure to the nozzle, sealing plates engaging the opposite ends of the rotor and closing the ends of a plurality of chambers adjacent to and on opposite sides of the nozzle and intake, respectively, means for forcing the plates yieldingly against the rotor, openings through one plate registering with a pair of chambers on opposite sides of the common axis of the nozzle and intake, said pair of chambers being wholly out of registry with the nozzle and intake, and an open connection between the openings in the plate.

12. An apparatus for conveying pulverulent material, which comprises a vessel for holding a body of the material, a rotor within the vessel out of contact with the walls thereof and having a plurality of parallel chambers open at their ends only and in a series concentric with the rotor axis, a transport conduit extending into the vessel and having an intake terminating close to one end of the rotor, an air nozzle extending into the vessel and terminating close to the other end of the rotor, the ends of the intake and nozzle being coaxial, said chambers being so constructed and arranged that on rotation of the rotor they are moved successively from positions in which at least one end is open to the space within said vessel to a position in which their open ends are in coincidence with the intake-nozzle axis, means for rotating the rotor, means for supplying air under pressure to the nozzle, means on the nozzle engaging the rotor and preventing escape of air between the end of the nozzle and the opposed end of the rotor, and means on the conduit engaging the rotor and preventing escape of air between the end of the intake and the opposed end of the rotor.

13. An apparatus for conveying fluent material which comprises a vessel for holding a body of such material, a transport conduit having an intake open to the interior of the vessel, an air nozzle for discharging air into the interior of the vessel and coaxial with and spaced from said intake, a member movable within the vessel, said member filling the space between said transport conduit intake and said nozzle and having at least one chamber open at each end, means for moving said member selectively to positions in which said open-ended chamber is in alignment with said intake and said nozzle and in which at least one open end of said chamber may receive fluent material from said vessel.

14. An apparatus for conveying pulverulent material, which comprises a vessel for holding a body of such material, a transport conduit having an intake open to the interior of the vessel, an air nozzle for discharging air into the interior of the vessel and coaxial with and spaced from the intake, a member movable within the vessel, said member filling the space between said transport conduit intake and said nozzle and having at least one chamber open at each end, means for moving said member selectively to positions in which said open-ended chamber is in alignment with said intake and said nozzle and in which at least one open end of said chamber may receive fluent material from said vessel, and means for introducing air into the material in the vessel to render the material sufficiently fluent to enter and fill the chamber during movement of said member.

15. An apparatus for conveying pulverulent material which comprises a vessel for holding a body of the material, a rotor within the vessel having the ends thereof spaced a substantial distance from the adjacent walls of the vessel, said rotor having a plurality of axially-extending parallel chambers with both ends open and in a series concentric with the rotor axis, a transport conduit extending into the vessel and having an intake terminating close to one end of the rotor, an air nozzle extending into the vessel and terminating close to the other end of the rotor, the ends of the transport conduit intake and nozzle being coaxial, said chambers being so constructed and arranged that on rotation of the rotor they are moved successively from positions in which their ends are open to the space within the vessel between the ends of the rotor and the adjacent sides of the vessel to positions in which their open ends are in coincidence with the transport conduit intake-nozzle axis, the vessel having a porous bottom beneath said rotor through which air may be introduced into the material in the vessel to render it sufficiently fluent to flow into the open ends of the chambers during rotation of the rotor, and means for rotating the rotor.

References Cited in the file of this patent

UNITED STATES PATENTS

| 1,184,403 | Woodley | May 23, 1916 |
| 1,321,262 | Townsend | Nov. 11, 1919 |
| 1,970,405 | Thomas | Aug. 14, 1934 |
| 2,011,133 | Yoss | Aug. 13, 1935 |
| 2,417,700 | McCarty | Mar. 18, 1948 |
| 2,681,748 | Weller | June 22, 1954 |
| 2,694,496 | Atkinson | Nov. 16, 1954 |

FOREIGN PATENTS

| 276,344 | Great Britain | Feb. 23, 1928 |